United States Patent
Jung

[11] Patent Number: 6,158,294
[45] Date of Patent: Dec. 12, 2000

[54] AUTOMATIC TRANSMISSION FOR BICYCLE

[76] Inventor: Yong Chul Jung, 1327 Bummal-dong, Susung-Ku, Taeku, 706-100, Rep. of Korea

[21] Appl. No.: 09/331,706

[22] PCT Filed: Oct. 22, 1998

[86] PCT No.: PCT/KR98/00332

§ 371 Date: Jun. 22, 1999

§ 102(e) Date: Jun. 22, 1999

[87] PCT Pub. No.: WO99/20518

PCT Pub. Date: Apr. 29, 1999

[51] Int. Cl.[7] .................................................. B62M 25/02
[52] U.S. Cl. .................................... 74/64; 474/70; 474/80
[58] Field of Search ................................ 474/70, 78, 80; 74/64, 336 R, 117; 475/259

[56] References Cited

U.S. PATENT DOCUMENTS

| | | | |
|---|---|---|---|
| 3,830,521 | 8/1974 | Gardel et al. | 280/236 |
| 3,948,112 | 4/1976 | Gilbert | 74/336 X |
| 4,571,219 | 2/1986 | Breden et al. | 474/70 |
| 4,713,042 | 12/1987 | Imhoff | 474/69 |
| 5,163,881 | 11/1992 | Chattin | 474/80 X |
| 5,295,916 | 3/1994 | Chattin | 474/80 X |
| 6,007,441 | 12/1999 | Tysver | 474/70 |
| 6,010,425 | 1/2000 | Tabe | 475/259 |

FOREIGN PATENT DOCUMENTS

| | | |
|---|---|---|
| 19625053 | 1/1997 | Germany . |
| 10-138985 | 5/1985 | Japan . |

*Primary Examiner*—Khoi Q. Ta

[57] ABSTRACT

An automatic transmission for bicycle including a support shaft with an interior created by a hollow shaft having a long hole drilled thereinto, and fixed grooves formed on its outer surface at regular intervals; a movable casing mounted on the support shaft; a fixation ball attached to the inside of the movable casing to mate with the fixed grooves; a pin inserted into the movable casing to pass through the long hole; a speed-change wire connected to the pin; a coil spring loaded between one side of the movable casing and a clamping bolt; a plurality of rotary balls seated in an outer groove of the movable casing to slightly protrude from the outer groove so that the rotary balls rotate along a thread bottom formed on an inner surface of a revolving body; a plurality of needle bearings provided to an outer surface of the revolving body; a friction band provided to the outside of the needle bearings, and having one side fixed to a rotating axle; and a weight provided to the friction band's other side and exposed to the outside of the rotating axle through an outlet.

2 Claims, 6 Drawing Sheets

AUTOMATIC TRANSMISSION FOR BICYCLE

TECHNICAL FIELD

The present invention relates to an automatic transmission for bicycle. More particularly, it relates to an automatic transmission for bicycle which is capable of changing a bicycle speed by using the speed of its turning wheels without extra manipulation.

BACKGROUND ART

Nowadays, most bicycles are equipped with a transmission system, and this transmission system makes it more convenient to ride the bicycle when a rider climbs a steep hill or drives the bicycle at a high speed. However, the conventional transmission system has a shift lever that is positioned on either one side of a bicycle steering bar's handle or one side of the bicycle frame. To change the bicycle speed, the rider has to select a gearshift during steering. Therefore, it is inconvenient to frequently change the driven gears to obtain the desired bicycle speed. If the rider puts the shift lever on an inappropriate position, an incorrect gear engagement takes place between the bicycle chain and the chain sprocket, which causes loud noise, abnormal wear and tear between gear sets, etc. In addition, the shift may distract a bicycle beginner from cycling, thereby causing a collision.

SUMMARY OF THE INVENTION

It is an object of the present invention to provide an automatic transmission for bicycle which changes a bicycle speed in response to the speed of its turning wheels without extra manipulation.

In order to achieve the above object, the present invention discloses an automatic transmission for bicycle including a support shaft with an interior created by a hollow shaft having a long hole drilled thereinto, and fixed grooves formed on its outer surface at regular intervals; a movable casing mounted on the support shaft; a fixation ball attached to the inside of the movable casing to mate with the fixed grooves of the support shaft; a pin inserted into the movable casing to pass through the support shaft's long hole; a speed-change wire connected to the pin; a coil spring loaded between one side of the movable casing and a clamping bolt; a plurality of rotary balls seated in an outer groove of the movable casing to slightly protrude from the outer groove so that the rotary balls rotate along a thread bottom formed on an inner surface of a revolving body; a plurality of needle bearings provided to an outer surface of the revolving body; a friction band provided to the outside of the needle bearings, and having one side fixed to a rotating axle; and a weight provided to the friction band's other side so it is exposed to the outside of the rotating axle through an outlet. A speed-change device is provided to the inside of the movable casing to fit in a given point of the fixed grooves.

BRIEF DESCRIPTION OF DRAWINGS

The present invention will become more fully understood from the detailed description given hereinbelow and the accompanying drawings which are given by way of illustration only, and thus are not limitative of the present invention, and wherein.

BEST MODE FOR CARRYING OUT THE INVENTION

Figure 1:
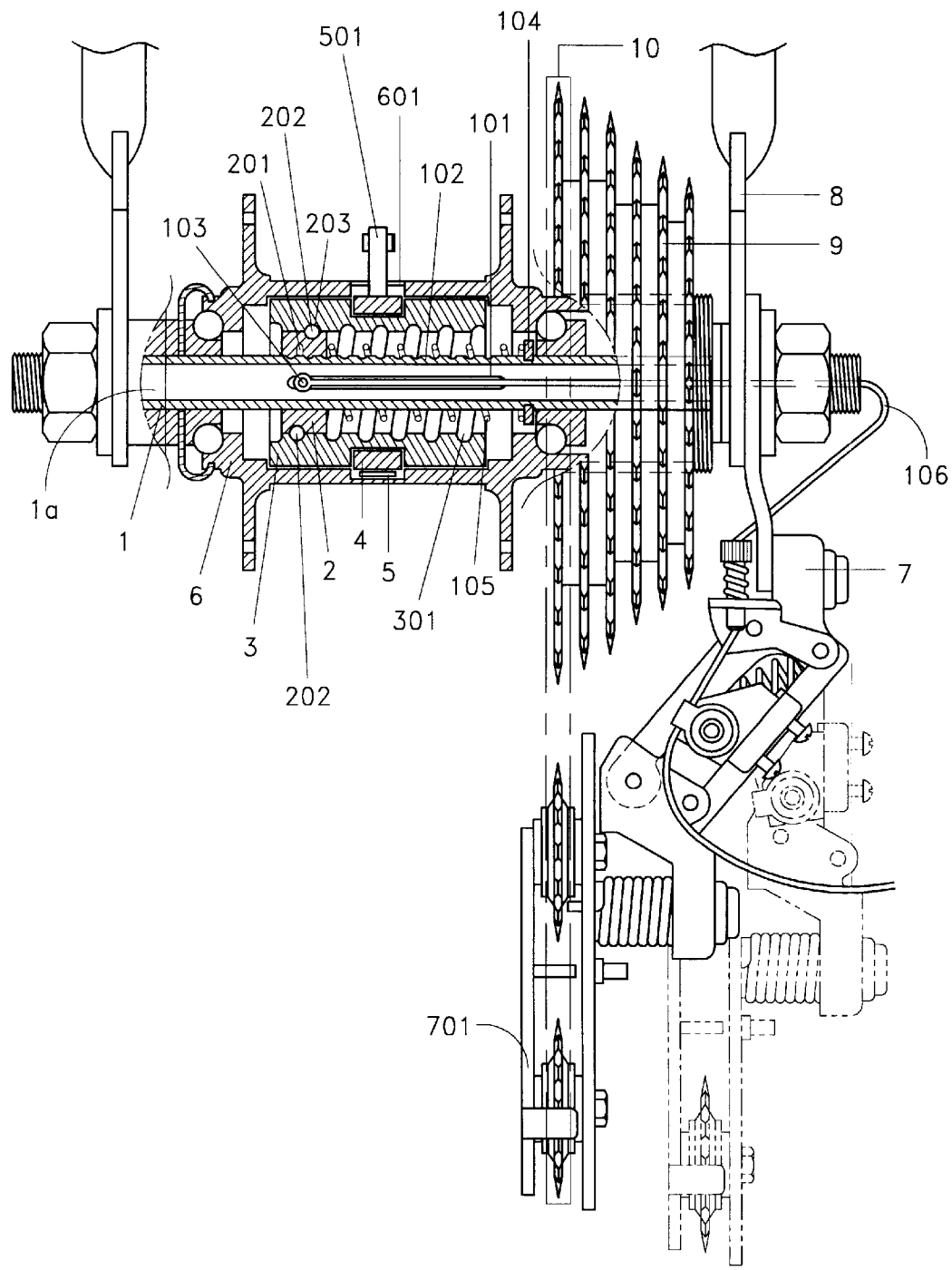
FIG. 1 is an enlarged sectional view of the present invention as taken from the rear.

The present invention will now be more fully described with reference to the accompanying drawings.

A support shaft 1 with an interior created by a hollow shaft 1a has a long hole 101 drilled thereinto, fixed grooves 102 formed on its outer surface at regular intervals, and a movable casing 2 mounted thereon. A fixation ball 201 is attached to the inside of movable casing 2 to mate with fixed grooves 102 of support shaft 1. A pin 103 is inserted into movable casing 2 to pass through support shaft 1's long hole 101. A speed-change wire 106 is connected to pin 103, and a coil spring 105 is loaded between one side of movable casing 2 and a clamping bolt 104. A plurality of rotary balls 202 are seated in an outer groove 203 of movable casing 2 to slightly protrude from outer groove 203 so that rotary balls 202 rotate along a thread bottom 301 formed on an inner surface of a revolving body 3. A plurality of needle bearings 4 are provided to an outer surface of revolving body 3. A friction band 5 is provided to the outside of needle bearings 4, and its one side is fixed to a rotating axle 6. A weight 501 is provided to friction band 5's other side to be exposed to the outside of rotating axle 6 through an outlet 601.

Speed-change wire 106, with one side fixed to a chain-moving body 7 for power transmission, has another side connected to pin 103 of movable casing 2 to pass through long hole 101 of support shaft 1. When the bicycle is not in motion, movable casing 2 continues pulling speed-change wire 106 while being pushed to the left by coil spring 105 loaded between movable casing 2 and clamping bolt 104, provided to an outer surface of one side of support shaft 1, and a guide 701 of chain moving body 7 keeps a first bicycle speed.

Once the bicycle starts to run, rotating axle 6 begins to revolve along with wheels provided to the outer surface of support shaft 1. At this point, weight 501, provided to one end of friction band 5 exposed to the outside through outlet 601 of rotating axle 6, turns along with rotating axle 6, and two forces are applied to weight 501. That is, weight 501 tries to be stationary by inertia and to be separated from rotating axle 6 by centrifugal force at the same time. These two forces apply air resistance generated during revolution. In other words, since friction band 5 encloses needle bearing 4, and has another outer end fixed to rotating axle 6, the air resistance is added to the inertia and centrifugal force acting on weight 501 provided to friction band 5's one end, thus compressing friction band 5.

Once friction band 5 is compressed, frictional force is increased between friction band 5 and needle bearings 4, thus turning revolving body 3 provided to the outside of needle bearings 4. That is, since the inertia, centrifugal force, and air resistance simultaneously act on weight 501 as rotating axle 6 turns, weight 501 is separated from rotating axle 6, and round-shaped friction band 5, enclosing needle bearings 4, is gradually compressed to the inside to increase the frictional force between a plurality of needle bearings 4 and friction band 5 in such a manner that revolving body 3 rotates.

Figure 2:
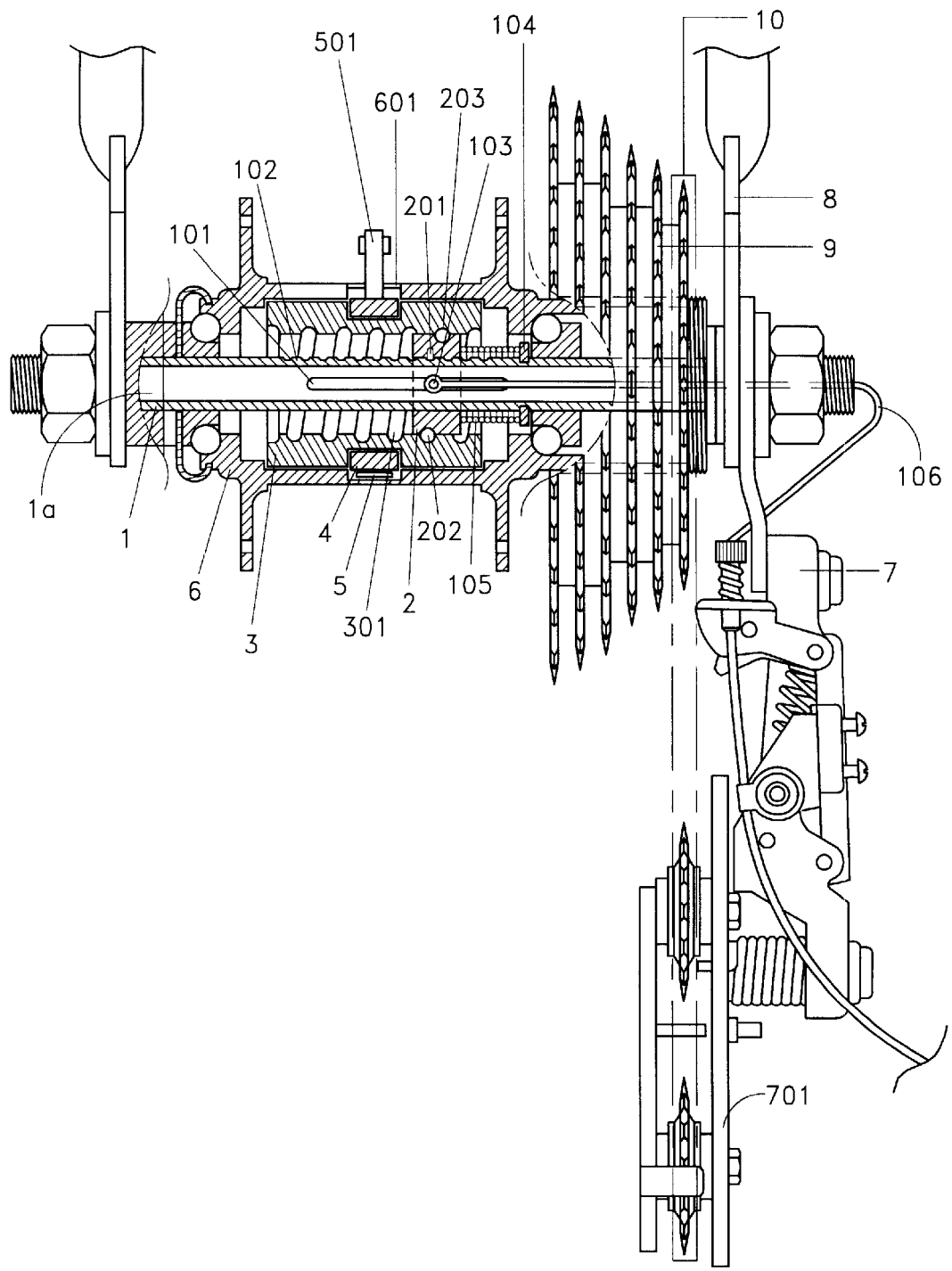
FIG. 2 depicts the operating state of a first preferred embodiment of the present invention.
Figure 3:
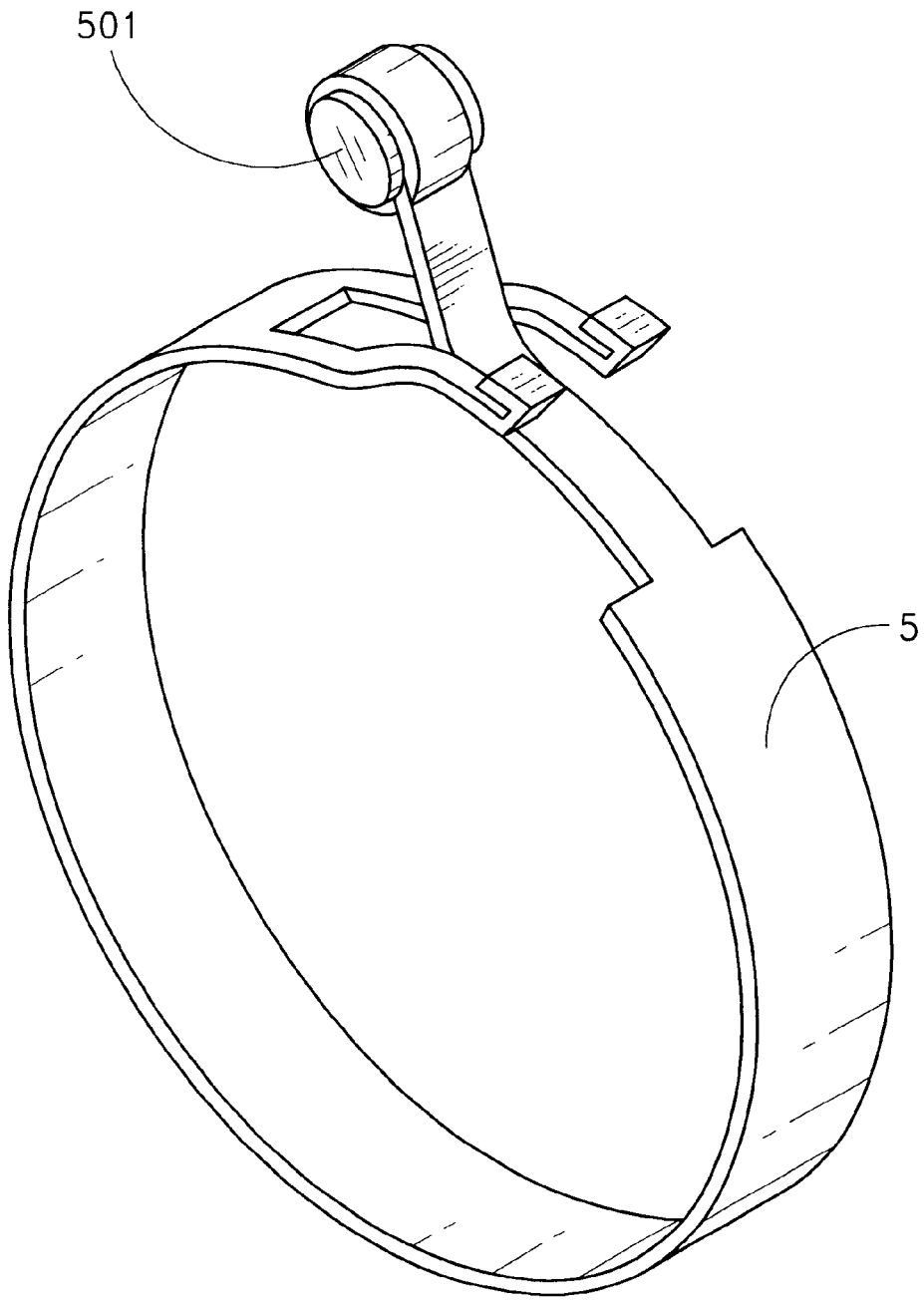
FIG. 3 is a perspective view of a friction band of the present invention.
Figure 4:
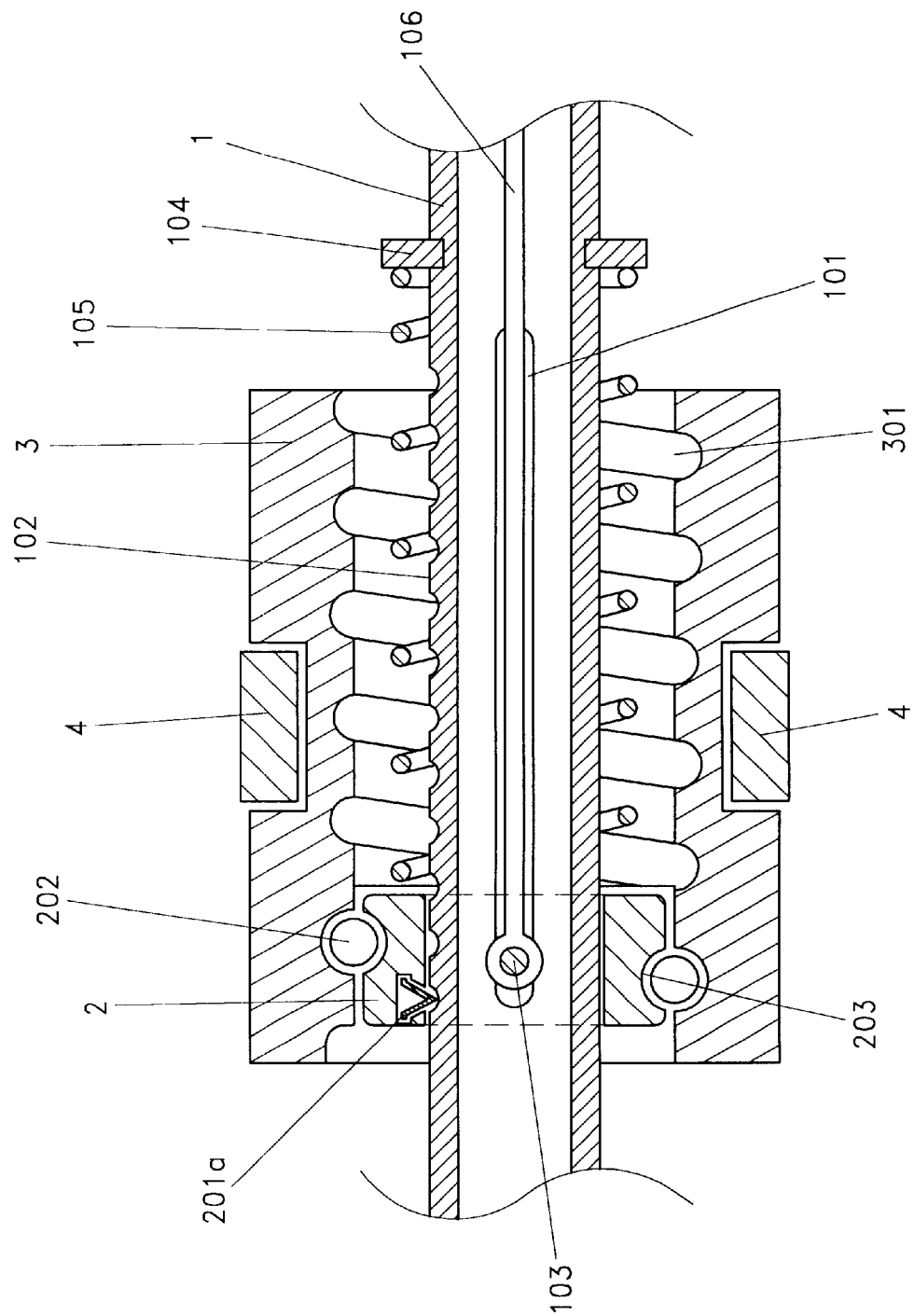
FIG. 4 depicts a movable casing in accordance with a second preferred embodiment of the present invention.
Figure 5:
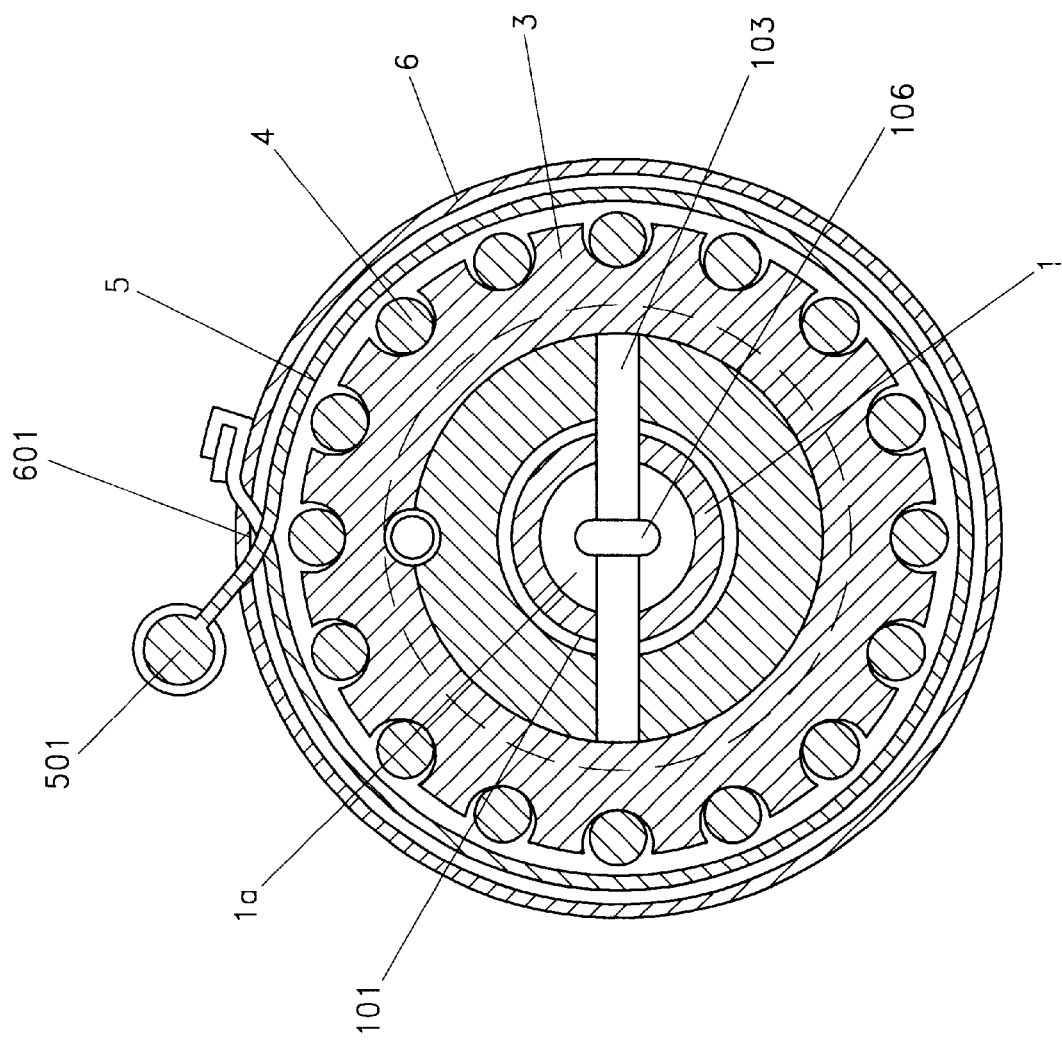
FIG. 5 is a longitudinal sectional view of the present invention.
Figure 6:
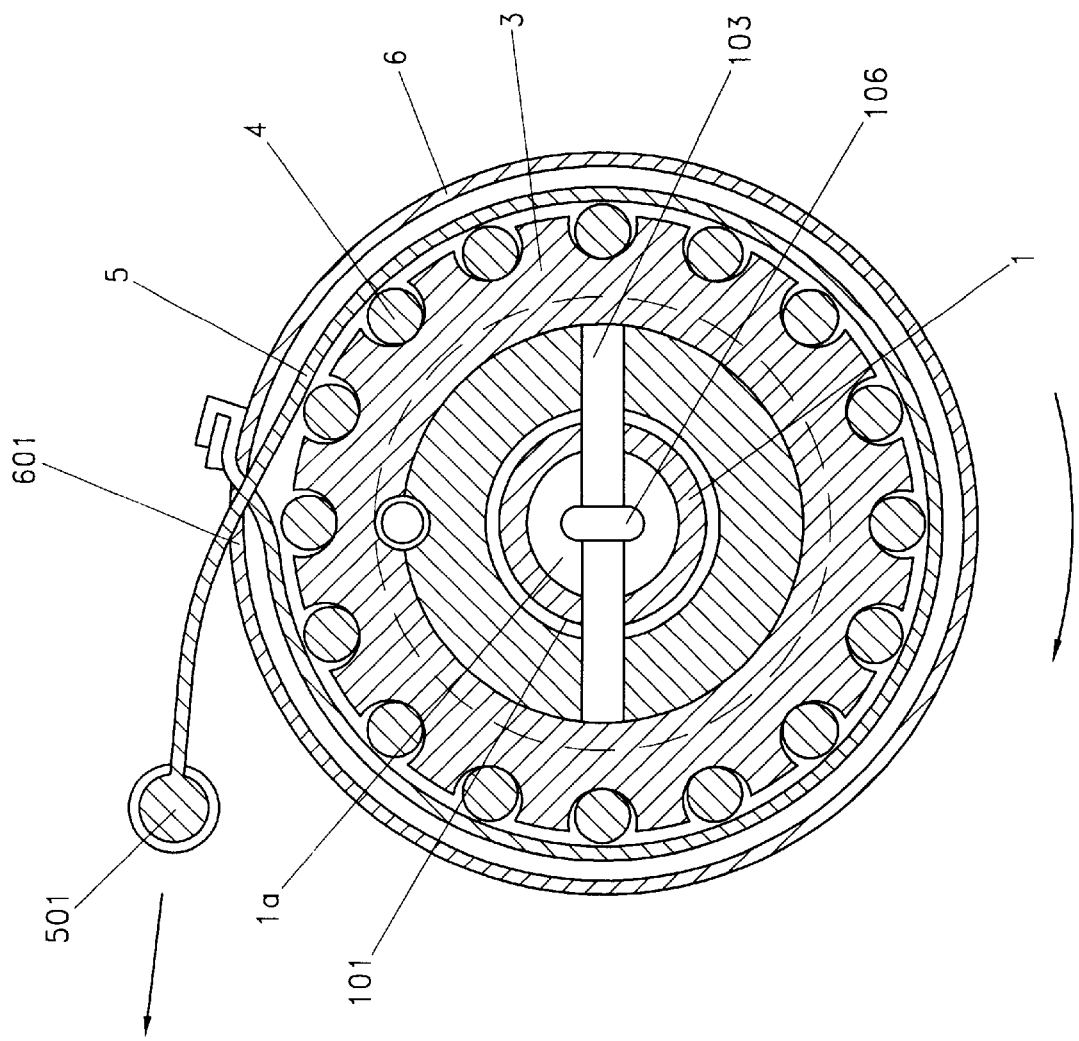
FIG. 6 depicts the operating state of the friction band of the present invention.

A plurality of rotary balls 202 are seated in outer groove 203, formed corresponding to thread bottom 301, to slightly protrude from groove 203, and movable casing 2 of which rotary balls 202's protruded parts are inserted into thread bottom 301 is moved to the right as rotary balls 202 move along thread bottom 301 by revolving body 3, as shown in FIG. 2. Speed-change wire 106, connected to pin 103 inserted into movable casing 2 to pass through long hole 101, is pulled by coil spring 702 and movable casing 2, and according to the rotating speed of the wheels, guide 701 is moved from low speed to high speed (first speed to sixth speed). As movable casing 2 having fixation ball 201 provided to its inside is moved along support shaft 1 by revolving body 3, fixation ball 201 is moved along fixed grooves 102 formed on support shaft 1's outer surface at regular intervals, and when the bicycle keeps on driving at a given speed so there is no change in the rotating force of revolving body 3, fixation ball 201 fits in a given point of fixed grooves 102 to inhibit movable casing 2 from moving. This also keeps guide 701 of chain moving body 7 from moving, and prevents incorrect engagement of chain sprocket 9 and chain 10, thus reducing abnormal abrasion of the chain sprocket and chain. As shown in FIG. 4, a speed-change device 201a may be used instead of fixation ball 201. As described above, the present invention is a significant improvement over the conventional manual bicycle transmission, and automatically changes the bicycle speed in response to the rotating speed of the wheels. The present invention solves any inconvenience that may occur by frequent shift, thus making it easier to enjoy cycling. It also increases the demand for bicycles, thereby contributing to promotion of people's health and preservation of environment.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An automatic transmission for bicycle comprising:
    a support shaft with an interior created by a hollow shaft having a long hole drilled thereinto, and fixed grooves formed on its outer surface at regular intervals;
    a movable casing mounted on the support shaft;
    a fixation ball attached to the inside of the movable casing to mate with the fixed grooves of the support shaft;
    a pin inserted into the movable casing to pass through the support shaft's long hole;
    a speed-change wire connected to the pin;
    a coil spring loaded between one side of the movable casing and a clamping bolt;
    a plurality of rotary balls seated in an outer groove of the movable casing to slightly protrude from the outer groove so that the rotary balls rotate along a thread bottom formed on an inner surface of a revolving body;
    a plurality of needle bearings provided to an outer surface of the revolving body;
    a friction band provided to the outside of the needle bearings, and having one side fixed to a rotating axle; and
    a weight provided to the friction band's other side so it is exposed to the outside of the rotating axle through an outlet.

2. An automatic transmission for bicycle according to claim 1, wherein a speed-change device is provided to the inside of the movable casing to fit in a given point of the fixed grooves.

\* \* \* \* \*